Aug. 24, 1926.
L. O. LEWTON
1,597,450
METHOD OF WRAPPING YEAST AND THE PRODUCT
Filed Nov. 24, 1925
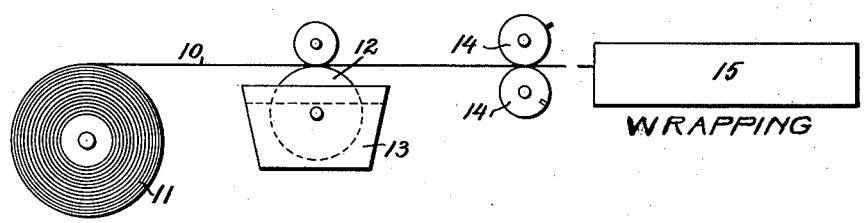
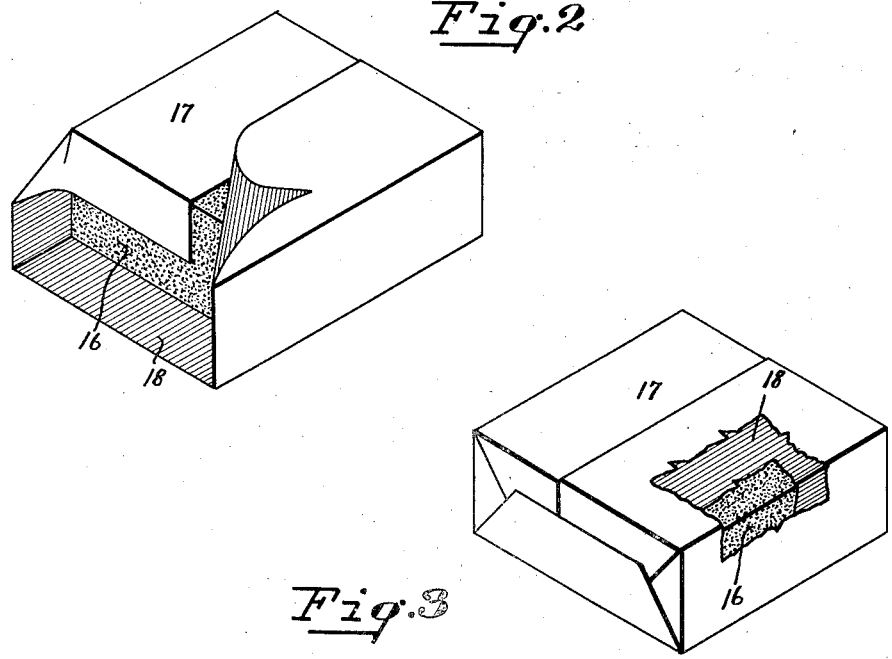
INVENTOR.
Lucy O. Lewton
BY
Mayer, Warfield & Watson
ATTORNEYS.

Patented Aug. 24, 1926.

1,597,450

UNITED STATES PATENT OFFICE.

LUCY OLGA LEWTON, OF PORT CHESTER, NEW YORK, ASSIGNOR TO THE FLEISCHMANN COMPANY, OF NEW YORK, N. Y., A CORPORATION OF OHIO.

METHOD OF WRAPPING YEAST AND THE PRODUCT.

Application filed November 24, 1925. Serial No. 71,238.

This invention relates to the preservation of yeast and particularly to a method and means whereby a yeast cake or the like may be protected from destructive agents.

An object of the invention is to provide a readily operable method of protecting a mass of yeast so that the same will be preserved in substantially unaltered condition during subsequent shipment and storage.

Another object is to provide a simple and inexpensive yeast packet of such nature that the deterioration of the yeast is inhibited.

Other objects of the invention will in part be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention reference should be had to the following detailed description taken in connection with the accompanying drawing, in which:—

Figure 1 is a diagrammatic showing of a method such as contemplated by the invention;

Fig. 2 is a perspective view of a cake of yeast with the wrapping material partially in place; and Fig. 3 is a similar view of a yeast packet found in accordance with the invention, parts of the protective layers being removed.

In order to preserve the quality of a mass of yeast, such as an ordinary yeast cake, during the shipment and storage thereof, it is desirable that the same be surrounded by a protective envelope which will adhere closely to the cake and will prevent the ingress thereto of those agents such as are contained in the atmosphere and encourage molding or other deterioration of the yeast, and which, at the same time, satisfies the commercial requirements of cheapness, lightness of weight, lack of bulk, ease of application, and ready removability. The envelope moreover, should not comprise materials which will adversely affect the flavor, odor, or appearance of the yeast. It is also desirable that the envelope employed be of such nature that, while it will substantially prevent the evaporation of moisture contained in the yeast and the consequent shrinking thereof, it will readily permit the escape of gases, such as carbon dioxide, which may be generated by the yeast, and which, if maintained in contact therewith, tend to cause liquefication or other alteration in the form or quality of the same.

The present invention contemplates the provision of an envelope which is sealed by a liquid or semi-liquid material of such character that it is substantially harmless, i. e. that it will not adversely affect the strength, taste, odor, color or other natural qualities of the yeast; that it will not tend to evaporate readily, or permeate the mass of yeast; and that it will nevertheless remain in a fluid state for a comparatively long period of time so as to prevent the ingress of deteriorating agents to the yeast cake while permitting the egress of generated gases when the amount thereof within the cake becomes sufficient to exert an internal pressure against the envelope. Because of its fluidity, moreover, the coating or sealing liquid will immediately flow together after the pressure within the packet has been reduced by the escape of gases so as to reseal the opening and re-form the protective envelope for the yeast cake, so as to prevent the ingress of air and the evaporation of moisture.

In the practice of the invention, a strip of wrapping material 10, such as foil, waxed paper, or the like, may be drawn from a feed roller 11 over a coating roll 12 which as exemplified, is partially immersed in a bath 13 of a relatively permanent liquid, preferably of an oily nature, so as to form a thin liquid film upon the strip. The strip may then be cut into sheets by any suitable means as by cutting rollers 14, whereupon each sheet may be wrapped about a cake of yeast by any suitable mechanism, as indicated diagrammatically at 15. The coating roller may, of course, be replaced by a wick or other equivalent coating means, and the method as a whole may be widely varied and may be performed manually if desired. In certain cases indeed, the step of coating the inner surface of the wrapping material may be omitted and the yeast cake may first be coated with a thin film of oil or other liquid which may be applied in any desired manner, as by spraying, whereby the yeast will not become saturated with the oil, it being desirable that the amount of oil in contact with the yeast be insufficient materially to alter the qualities thereof, after which the wrapping material may be applied to the coated cake.

There is exemplified in Fig. 2 a yeast cake 16 which is partially wrapped in a sheet 17 of wrapping material having an inner coating 18 of a substantially permanent liquid material, i. e. a material which will neither evaporate nor solidify readily, but which will remain in a substantially liquid state for at least such length of time as is likely to ensue during the shipment and storage of the yeast.

Fig. 3 shows a completed packet wherein the yeast cake 16 is surrounded by a sealing film of oil or other coating liquid 18 about which an outer wrapping 17 of foil or similar material extends. The wrapping material serves its usual purpose of protecting the yeast against breakage, contamination and the like, and the liquid serves to seal the pores in the wrapping material and the joints between the folded portions of the same, while permitting the escape of generated gases, and also serves to insure an intimate contact of the wrapping with the yeast. As a result the full volume and shape of the yeast cake, as well as the quality of the yeast itself, is effectually preserved.

In order readily to permit the escape of generated gases, it is desirable to employ an oil having a low surface tension such, for example, as olive oil or peanut oil. Yeast cakes wrapped in foil coated with a film of olive oil have been found to keep for as long as twelve days or more without molding, discoloration, or other deterioration, such as would normally take place in three or four days. Among the other liquid materials which have been satisfactorily employed are mineral oils, maize oils, vegetable lards, and cocoa butter.

It will be appreciated from the above that the term "liquid" is intended to include semi-liquid materials.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:—

1. In the art of preserving yeast, the method which includes surrounding a mass of yeast with a surface film of a substantially permanent liquid and with an outer wrapping of sheet material.

2. In the art of preserving yeast, the method which includes wrapping about a cake of yeast a sheet of material coated with a substantially permanent liquid.

3. In the art of preserving yeast, the method which includes surrounding a mass of yeast with a surface film of a substantially permanent liquid and thereafter forming a wrapping of sheet material thereupon.

4. In the art of preserving yeast, the method which includes forming a film of oil upon a sheet of material and wrapping the same about a cake of yeast.

5. As an article of manufacture, a mass of yeast surrounded by a film of a substantially permanent liquid and an outer layer of wrapping material.

6. As an article of manufacture, a yeast cake surrounded by a film of oil and an outer wrapping of foil.

7. As an article of manufacture, a mass of yeast surrounded by a layer of wrapping material, the space between the yeast and the wrapping material being sealed by a substantially permanent liquid.

8. As an article of manufacture, a mass of yeast wrapped in a sheet of material coated with a substantially permanent liquid.

9. As an article of manufacture, a yeast cake surrounded by a film of a substantially permanent liquid and a layer of foil.

10. As an article of manufacture, a yeast cake surrounded by an envelope comprising a film of oil and a wrapping of sheet material.

11. As an article of manufacture, a yeast cake wrapped in a sheet of material coated with a vegetable oil.

12. As an article of manufacture, a yeast cake surrounded by a layer of foil, the inner surface of which is coated with olive oil.

In testimony whereof I affix my signature.

LUCY OLGA LEWTON.